(12) United States Patent
Van Dingenen et al.

(10) Patent No.: US 12,435,773 B2
(45) Date of Patent: Oct. 7, 2025

(54) METHODS AND SYSTEMS OF A TWO SPEED COUNTERSHAFT TRANSMISSION

(71) Applicant: Dana Belgium N.V., Flanders (BE)

(72) Inventors: Joachim Van Dingenen, Drongen (BE); Jan Markey, Wingene (BE)

(73) Assignee: DANA BELGIUM N.V., Bruges (BE)

(*) Notice: Subject to any disclaimer, the term of this patent is extended or adjusted under 35 U.S.C. 154(b) by 38 days.

(21) Appl. No.: 18/336,680

(22) Filed: Jun. 16, 2023

(65) Prior Publication Data

US 2024/0418243 A1    Dec. 19, 2024

(51) Int. Cl.
| | |
|---|---|
| *F16H 3/091* | (2006.01) |
| *F16H 3/08* | (2006.01) |

(52) U.S. Cl.
CPC ..... *F16H 3/091* (2013.01); *F16H 2003/0818* (2013.01); *F16H 2200/0021* (2013.01); *F16H 2200/0034* (2013.01)

(58) Field of Classification Search
CPC .............. F16H 3/091; F16H 2003/0818; F16H 2200/0021; F16H 2200/0034
USPC ........................................................ 74/325
See application file for complete search history.

(56) References Cited

U.S. PATENT DOCUMENTS

| | | |
|---|---|---|
| 6,832,978 B2 | 12/2004 | Buchanan et al. |
| 8,882,632 B2 | 11/2014 | Kumazaki et al. |
| 9,109,693 B2 | 8/2015 | Lee et al. |
| 10,451,146 B2 | 10/2019 | Tseng et al. |
| 10,618,520 B2 | 4/2020 | Hansson et al. |
| 10,844,935 B2 | 11/2020 | Wu et al. |
| 10,995,824 B1* | 5/2021 | Bielefeld ................ F16H 3/091 |
| 11,697,339 B2* | 7/2023 | Miura ...................... B60K 6/40 |
| | | 475/5 |
| 2022/0065331 A1 | 3/2022 | Van Dingenen et al. |
| 2022/0134861 A1* | 5/2022 | Beck ..................... B60K 6/547 |
| | | 180/65.21 |
| 2022/0170534 A1* | 6/2022 | Hannon ................. B60K 17/08 |

FOREIGN PATENT DOCUMENTS

CN        107131296 A      9/2017

OTHER PUBLICATIONS

Coenen, P. et al., "Electric Power Shift Transmission and Power Shift Method," U.S. Appl. No. 18/146,734, filed Dec. 27, 2022, 31 pages.

* cited by examiner

*Primary Examiner* — Minnah L Seoh
(74) *Attorney, Agent, or Firm* — McCoy Russell LLP

(57) ABSTRACT

Systems and methods for an electric transmission system are herein provided. The electric transmission system, in one example, comprises an electric motor driving an input shaft, a first wet clutch position on a first end of a countershaft, and a second wet clutch positioned on a second end of the input shaft. The first wet clutch selectively engages the countershaft with a first clutch gear and the second wet clutch selectively engages the input shaft with second clutch gear. The input shaft meshes with the second clutch gear and the countershaft meshes with the first clutch gear. The electric transmission system further comprises an output shaft rotationally coupled to the countershaft.

19 Claims, 11 Drawing Sheets

|  | First gear | Second gear |
|---|---|---|
| First wet clutch | Engaged | Disengaged |
| Second wet clutch | Disengaged | Engaged |

FIG. 3C ical field relates...

METHODS AND SYSTEMS OF A TWO SPEED COUNTERSHAFT TRANSMISSION

TECHNICAL FIELD

The present disclosure relates generally to transmissions, more specifically two speed transmissions for electric vehicles.

BACKGROUND AND SUMMARY

Heavy duty vehicles, such as front end loaders, may make use of electric transmission systems to generate motive power and provide an attractive alternative in terms of hydrocarbon emissions in relation to vehicles that solely rely on internal combustion engines for propulsion. Certain electric transmission systems have used multi-speed transmissions to increase the unit's available gear ratios. The transmissions may include one or more shafts and gears which may engage or disengage with one another based on a selected gear ratio.

Multi-speed transmissions of the countershaft type may include one or more friction clutches and associated gears operatively assembled on a plurality of shafts, including an input shaft, a countershaft, and an output shaft. Power input to the input shaft is provided by a prime mover and is transmitted towards the output shaft by one of the one or more friction clutches. High input speeds are often compensated for by additional gears, shafts, and the like, including for example, input speed reduction gear sets.

The inventors have recognized various issues with such an approach. For example, the additional number of components such as gears, shafts and bearings as well as the increased complexity and size of the housing can lead to an overly large package, as well as increased weight. Large packages, such as described, may not be suitable for particular vehicle platforms, for example, those vehicle platforms that demand a small distance between output interfaces (e.g., flanges) for installation. Further, additional gears, shafts, and bearings may decrease the overall efficiency of the transmission system.

The inventors herein have recognized these issues and developed a two-speed transmission system that at least partially addresses these issues. In one embodiment, the approaches disclosed herein provide an electric transmission system comprises a two-speed countershaft transmission system, which comprises a first wet friction clutch positioned to selectively engage a countershaft and a second wet friction clutch positioned to selectively engage an input shaft. The input shaft may be driven by an electric motor of the electric transmission system and an output shaft may be rotationally coupled to the countershaft to transfer power downstream. The input shaft is rotationally coupled to a first gear that meshes with a first clutch gear of the first wet friction clutch. The countershaft is rotationally coupled to a second gear that meshes with a second clutch gear of the second wet friction clutch. When engaged, the first wet friction clutch rotationally couples the countershaft to the input shaft via the first meshing of gears and, when engaged, the second wet friction clutch rotationally couples the input shaft via the second meshing of gears. In this way, by positioning the second wet friction clutch to selectively engage the input shaft, the electric transmission system may allow for high input speeds from the electric motor and may reduce degradation to the first wet friction clutch, thereby allowing the transmission system to operate at high efficiency by reducing slip speeds of each of the first and second wet friction clutches when the clutches are disengaged.

Further, the electric transmission system is configured to allow addition of a layshaft that is rotationally coupled to two additional gears without unduly increasing overall package size. The layshaft may be positioned between the countershaft and the output shaft. The addition of the layshaft may enable the transmission system to reach high overall torque ratio. In this way, the electric transmission system may be configurable for various vehicle platforms or applications. A housing for the transmission may be configured to fit the transmission with and/or without the additional layshaft, thereby decreasing manufacturing costs and productions.

The electric transmission system is configured to allow the electric motor to be removed and replaced and/or exchanged by means of an adaptor flange connected to the input shaft. In this way, the electric motor may be chosen to fit the application or vehicle platform. The wet clutches of the transmission system may allow for maintaining good shift quality with different electric motors and electric motor parameters such as speed, torque, and/or inertia.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIG. 3C shows a table that correlates operational gear and clutch engagement in the two-speed transmission system.

DETAILED DESCRIPTION

Figure 1:
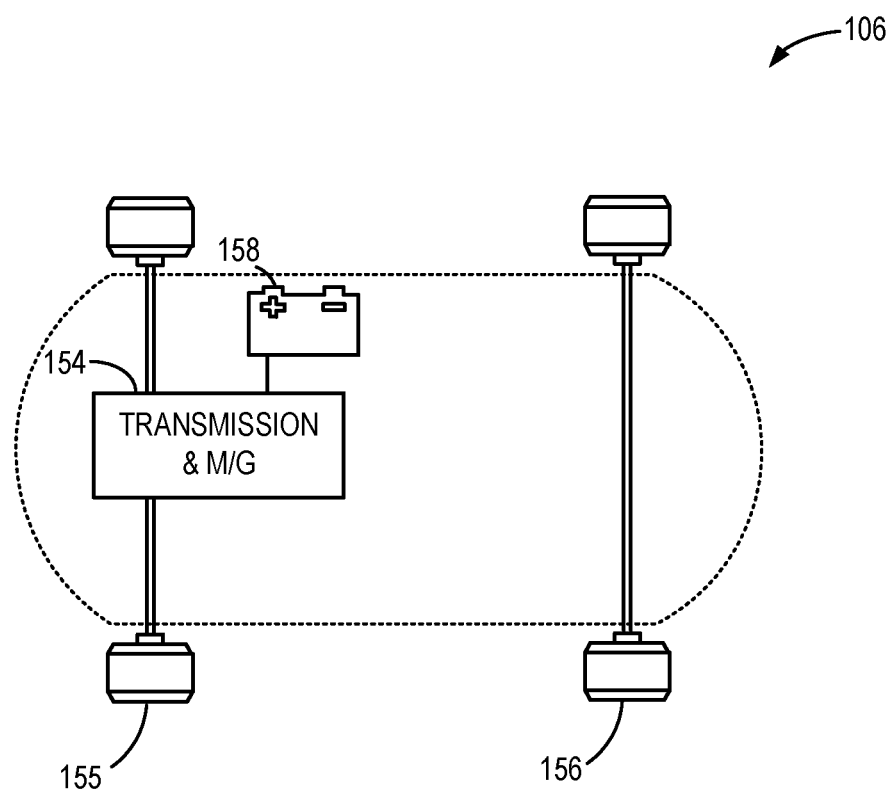
FIG. 1 shows a schematic of an exemplary vehicle.
Figure 1:
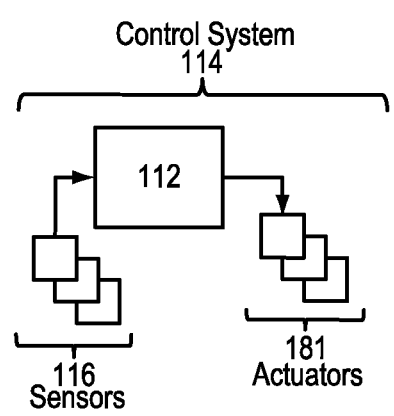

An electric transmission system comprising a two-speed transmission system with two different gear ratios providing a compact package and efficient system is described herein. In some examples, the two-speed transmission includes a two-speed gearbox comprising two wet friction clutches for gear shifting and at least three shafts, including an input shaft, a countershaft, and an output shaft. A compact layout of a plurality of shafts, gears, and clutches in the system allows the system to achieve the desired gear ratio selection without unduly impacting the system's space efficiency. The system further allows for addition of a layshaft with additional gears to allow for increased torque ratio and may thus allow for integration into vehicle platforms that demand higher ratios. The electric transmission system further comprises a prime mover such as an electric motor driving the input shaft. A first wet friction clutch may be positioned towards a first end of a countershaft and configured to selectively engage the countershaft. A second wet friction clutch may be positioned towards a second end of the input shaft and configured to selectively engage the input shaft. A first gear rotationally coupled to the input shaft may mesh with a first clutch gear of the first wet friction clutch forming a first meshing. A second gear rotationally coupled to the counter shaft may mesh with a second clutch gear of the second wet friction clutch forming a second meshing. An output shaft is rotationally coupled to the countershaft via a third gear rotationally coupled to the countershaft that meshes with a fourth gear rotationally coupled to the output shaft.

The transmission system as herein described also allows for addition of a layshaft that may be rotationally coupled to the countershaft. The transmission system according to this second embodiment comprises the same input shaft, countershaft, output shaft, first wet friction clutch, and second wet friction clutch, without change to the arrangement of gear/clutch meshings. The layshaft may be added to rotationally couple to the third gear on the countershaft and to the fourth gear on the output shaft via a fifth and sixth gear, respectively. The third and fourth gears may have a variety of sizes, for example, in instances in which the layshaft is not included, the third and fourth gears may each have respective first sizes while, in instances in which the layshaft is included, the third and fourth gears may each have respective second, different sizes so as to mesh with the fifth and sixth gears, respectively. The additional layshaft as well as the additional gears may provide increased torque ratios and as such the transmission system, with variable configurations as herein described, may be used for a variety of vehicle platforms. A housing of the transmission further comprises an adaptor flange coupled to the first end of the input shaft that allows for a variety of different electric motors to be coupled to the input shaft. The wet friction clutches may allow for a wide range of electric motor parameters such as torque, speed, and inertia, thereby increasing system flexibility.

FIGS. 1-3B and 4-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 5A-8 are drawn approximately to scale. However, other relative component dimensions may be used, in other embodiments.

Turning now to the figures, FIG. 1 shows a schematic depiction of a vehicle system 106 that can derive propulsion power from an electric motor 154 (e.g., a drive motor). In some examples, the vehicle system 106 may be a front loader or compact wheel loader vehicle system. In one embodiment, electric motor 154 may be a traction motor. Electric motor 154 receives electrical power from a traction battery 158 to provide torque to rear vehicle wheels 155. Electric motor 154 may also be operated as a generator to provide electrical power to charge traction battery 158, for example, during a braking operation. It should be appreciated that while FIG. 1 depicts an electric motor 154 mounted in a rear wheel drive configuration, other configurations are possible, such as employing the electric motor 154 in a front wheel configuration, or in a configuration in which a first output yoke or other interface drives the rear vehicle wheels 155 and a second output yoke or other interface drives front vehicle wheels 156.

Electric motor 154 may be included as part of an transmission comprising a gearbox (to be described further herein). Additionally or alternatively, the electric motor 154 may be coupled to an outside of a transmission/gearbox housing. The transmission/gearbox may include at least one clutch and one or more shafts. Controller 112 may send a signal to an actuator of the clutch(es) to engage or disengage the clutch(es), so as to couple or decouple power transmission from the electric motor 154 to various shafts and gears therein.

Controller 112 may form a portion of a control system 114. Control system 114 is shown receiving information from a plurality of sensors 116 and sending control signals to a plurality of actuators 181. As one example, sensors 116 may include sensors such as a battery state of charge sensor, clutch pressure sensor, speed sensors etc. As another example, the actuators may include the clutch(es), etc. The controller 112 may receive input data from the various sensors, process the input data, and trigger the actuators in response to the processed input data based on instruction or code programmed therein corresponding to one or more routines.

Figure 2:
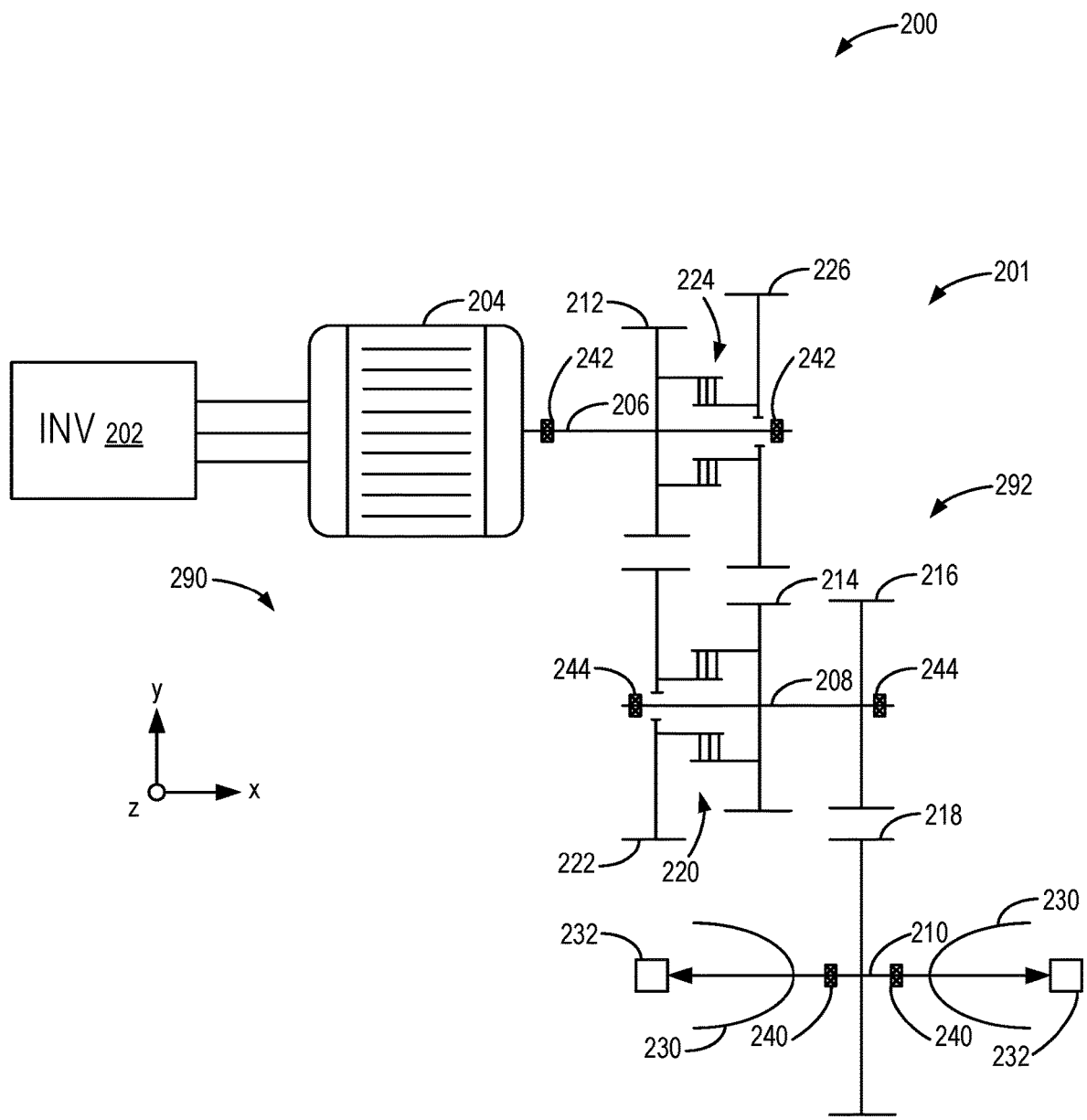
FIG. 2 shows a schematic of a two-speed transmission system according to a first embodiment.

Turning now to FIG. 2, a schematic layout of an exemplary electric transmission system 200 is shown. For reference, an axis system is provided in FIG. 2, as well as in FIGS. 3A-B and 4-8. The y-axis may be a vertical axis (e.g., parallel to a gravitational axis), the x-axis may be a lateral axis (e.g., a horizontal axis), and/or the z-axis may be a longitudinal axis. However, the axes may have other orientations in other examples.

The electric transmission system 200 may comprise an electric motor 204 and a multi-speed transmission 201 (e.g., a two-speed electric transmission) and may therefore be a multi-speed electric transmission system. The multi-speed transmission 201 may comprise two wet clutches (e.g., a first wet clutch 220 and a second wet clutch 224), an input shaft 206, a countershaft 208, an output shaft 210, and a plurality of gears coupling the components therein. Electric motor 204 (e.g., electric motor 154 of FIG. 1) may be coupled to the input shaft 206 such that the input shaft 206 is driven by the electric motor 204. As described herein, the input and output of the transmission are described with regard to the mechanical power flow through the transmission during a drive mode. However, it will be understood that when the electric transmission system is operated in a regeneration mode, mechanical power flows back through the transmission to the electric motor.

Speed and torque of the electric motor 204 may be controlled by an inverter 202. The inverter 202 may be designed to convert direct current (DC) to alternating current (AC) and vice versa. In some examples, the electric motor 204 and/or the inverter 202 may be multi-phase devices (e.g., three-phase devices) which can achieve greater efficiency when compared to other types of motors. However, motors and inverters designed to operate using more than three phases have been envisioned.

In some examples, the input shaft 206 may be a rotor shaft that couples the electric motor 204 to other components of the electric transmission system 200, thereby converting power from the electric motor 204 into rotational power usable by the transmission. The electric motor 204 may be an electric traction motor. The input shaft 206 may receive power from the electric motor 204 and the input shaft 206 may in turn transfer power to downstream components based on configuration and engagement/disengagement of clutches. In some examples, the countershaft 208 may transfer power flow from the input shaft 206 to the output shaft 210 and therefore may not be directly coupled to the electric motor 204.

The input shaft 206 may be rotationally coupled to a first gear 212. The countershaft 208 may be rotationally coupled to a second gear 214 and a third gear 216. The output shaft 210 may be rotationally coupled to a fourth gear 218. The first wet clutch 220 (e.g., a first wet friction clutch) may be positioned on a first end 290 of the countershaft 208 and may be configured to rotationally couple the input shaft 206 to the countershaft 208 via the first gear 212. The first wet clutch 220 may comprise one or more friction plates, in some examples the first wet clutch 220 may have a multi-plate (e.g., multi-disc) configuration. The first wet clutch 220 may further comprise a first clutch gear 222 that selectively engages with the countershaft 208 according to signals from a control system (e.g., control system 114 of FIG. 1) and pressure by the hydraulic system. The first clutch gear 222 may mesh with the first gear 212, forming a first meshing, such that rotation of the first gear 212 transfers rotation to the first clutch gear 222 and consequently to the countershaft 208 when the first clutch gear 222 is engaged with the countershaft 208. The first wet clutch 220 may be fixedly attached to the second gear 214.

The second wet clutch 224 (e.g., second wet friction clutch) may be positioned at a second end 292 of the input shaft 206 and may be configured to rotationally couple the input shaft 206 to the countershaft 208 via the second gear 214. The second wet clutch 224 may comprise one or more friction plates, in some examples the second wet clutch 224 may have a multi-plate configuration. The second wet clutch 224 may further comprise a second clutch gear 226 that may selectively engage with the input shaft 206 according to signals from the control system. The second clutch gear 226 may mesh with the second gear 214, forming a second meshing, such that rotation of the second clutch gear 226, when engaged with the input shaft 206, transfers rotation to the second gear 214 and consequently to the countershaft 208. In some examples, the second wet clutch 224 may be fixedly attached to the first gear 212.

The third gear 216, which as noted is rotationally coupled to the countershaft 208, may mesh with the fourth gear 218 in order to transfer rotation from the countershaft 208 to the output shaft 210 to which the fourth gear 218 is rotationally coupled. The output shaft 210 may be coupled to or otherwise formed with one or more output interfaces 230, in some examples two output interfaces 230. Output interfaces 230 may be positioned at either end of the output shaft 210. The output interfaces 230 may be, in some examples, flanges, yokes, or the like. Output interfaces 230 may be designed to mechanically attach to downstream driveline components 232 such as shafts, joints, and the like that transfer mechanical power to drive axles (not shown). Alternatively, the output interfaces 230 may transfer mechanical power directly to drive axles or axle assemblies that include components such as a differential, axle shafts, and drive wheels.

All of the shafts herein described may extend horizontally, parallel to the x-axis, and all of the gears herein described may extend vertically, parallel to the y-axis. In some examples, the input shaft 206 may extend through the first gear 212 and the second wet clutch 224 and the countershaft 208 may extend through the first wet clutch 220, the second gear 214, and the third gear 216. In some examples, the input shaft 206 may be vertically above the countershaft 208 and the output shaft 210 and the countershaft 208 may be vertically above the output shaft 210. The input shaft 206, the countershaft 208, and the output shaft 210 may be parallel to each other, which may provide a desired form factor of a transmission housing in which the electric transmission system 200 is housed within. Further, the parallel architecture may enable bearing locations to be more supported throughout the transmission.

The multi-speed transmission 201 may further comprise a plurality of bearings. Bearings 242 may support and facilitate rotation of the input shaft 206, bearings 244 may support and facilitate rotation of the countershaft 208, and bearings 240 may support and facilitation rotation of the output shaft 210. The bearings 240, 242, and 244 may be tapered roller bearings, ball bearings, or other suitable type of bearings that can withstand high input speeds.

The layout herein described in which the first wet clutch 220 is positioned on the countershaft 208 and the second wet clutch 224 is positioned on the input shaft 206 may reduce slip speed when each of the wet clutches are in the open position (e.g., disengaged from respective shafts). In this way, high input speeds may be allowed because of the second wet clutch 224 being positioned on the input shaft 206, wherein the first wet clutch 220, when disengaged, may avoid degradation when in second gear (e.g., when the second wet clutch 224 is engaged) that would be caused by burning as a result of high input speeds. Further, reduced slip speeds may reduce drag, thereby increasing efficiency of the transmission system.

Further, the number of gear meshings of the clutches may be reduced with the layout as presented herein. As described, when the first wet clutch 220 is engaged, the first meshing may be between the first gear 212 and the first clutch gear 222 and the second meshing may be between the countershaft 208 and the output shaft 210 (e.g., meshing via the third and fourth gears). When the second wet clutch 224 is engaged, the first meshing may be between the second gear 214 and the second clutch gear 226 and the second meshing may be between the countershaft 208 and the output shaft 210. For a two-speed transmission that comprises wet clutches, two gear meshes may be the smallest number of gear meshes allowable for the wet clutch slip speeds. In this way, efficiency of the electric transmission system 200 may be increased. Further, as will be described with respect to FIG. 6, with regard to the first and second wet clutches 220, 224, charging pressure for each of the wet clutches may be supplied axially on a respective shaft end, which allows for minimization of rotary seal diameter and therefor minimizing rotary seal drag and increasing efficiency of the electric transmission system 200.

Wet clutches, as herein included in the electric transmission system 200, may allow for increased flexibility of use and shift quality for the system. Using wet friction clutches may allow for power interruptions during shifting transients to be avoided when compared to dog clutches, synchronizers, and the like. Shift quality may be maintained for different electric system (e.g., electric motor and inverter) variants by limited retuning of wet clutch parameters. Other layouts that include different types of clutches, such as synchronizers or dog clutches, may need larger control parameter changes to maintain the shift quality. Also a lower variation of electric systems will be able to match with these dog clutch or synchronizer based systems. As such, the systems described herein have increased flexibility. In this way, because of the flexibility of the electric transmission system 200, the system may be matched to different electric motors and used for various applications.

The layout of the electric transmission system 200 may be such so as to allow addition of a fourth shaft. When the fourth shaft is included in the transmission, as is described with respect to FIG. 4 below, overall torque ratio may be increased. The transmission system may be such so as to allow addition and removal of the fourth shaft based on application of the transmission. A housing of the transmission system may be configured to accommodate either the first embodiment or the second embodiment with minimal increase in overall package size.

Figure 3A:
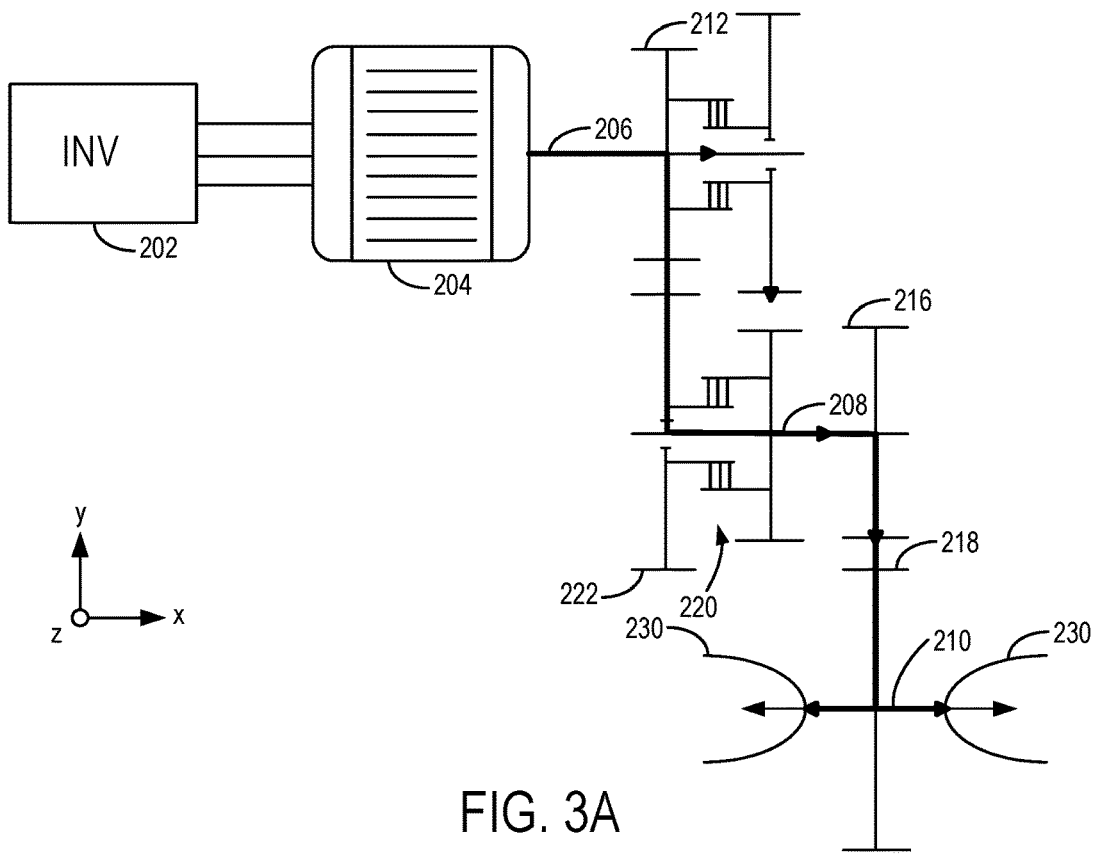
FIG. 3A shows a power path in the transmission in a first operating gear ratio of the two-speed transmission system.
Figure 3B:
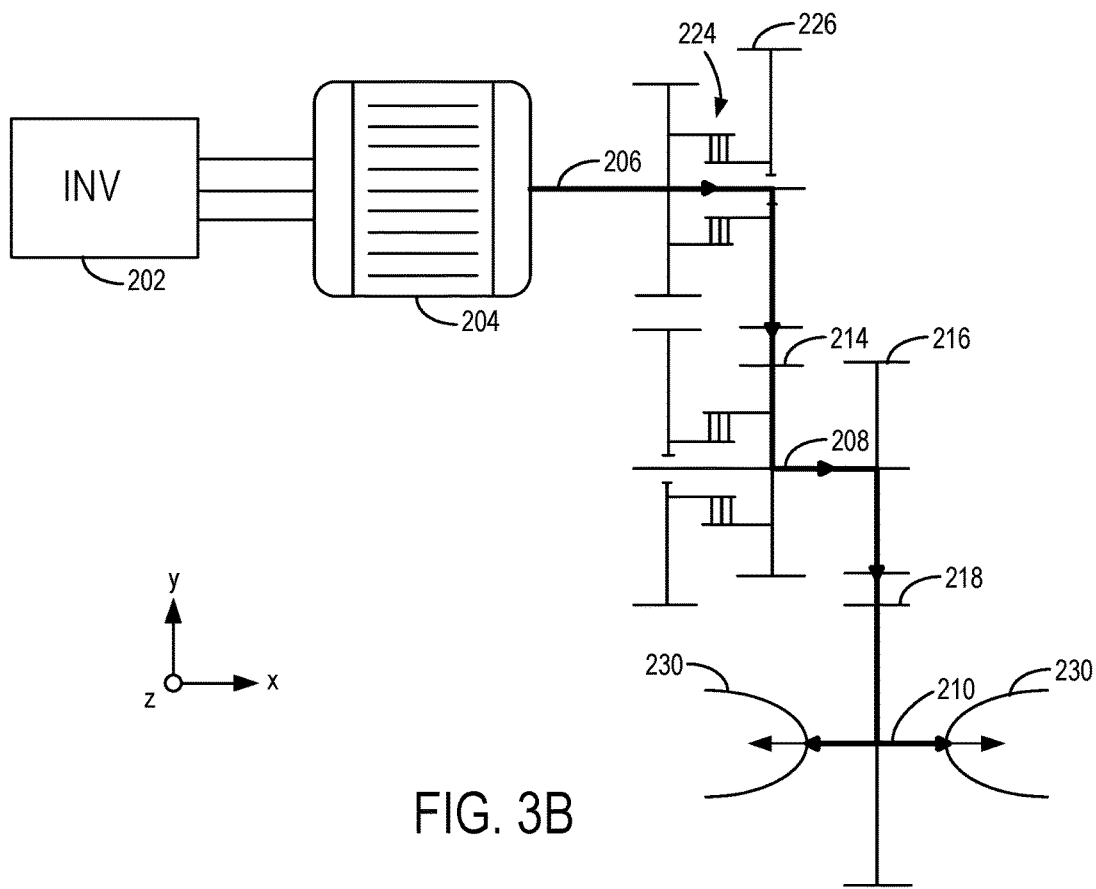
FIG. 3B shows a power path in the transmission in a second operating gear ratio of the two-speed transmission system.

Turning now to FIGS. 3A and 3B, power paths in a first and second gear ratio of the electric transmission system 200 of FIG. 2 are shown. FIG. 3A specifically shows a power path of the first gear ratio and FIG. 3B specifically shows a power path of the second gear ratio. Directionality of power transfer through the electric transmission system 200 may be altered by selective clutch engagement, as will be described. The multi-speed transmission 201 may allow for one of the two wet clutches to be engaged at a time. Operational gear and clutch engagements are shown in a table 300 in FIG. 3C.

In the power path of the first gear ratio as depicted in FIG. 3A, power is transferred from the electric motor 204 into the input shaft 206. From the input shaft 206, power is transferred into the first gear 212 and into the first clutch gear 222 of the first wet clutch 220 via the first meshing. The first clutch gear 222, engaged with the countershaft 208, transfers power to the countershaft 208. The countershaft 208 transfers power to the third gear 216, which transfers power into the fourth gear 218 and finally into the output shaft 210. From the output shaft 210, power is transferred to the output interfaces 230 and to further downstream components as previously described.

In the power path of the second gear ratio as depicted in FIG. 3B, power is transferred from the electric motor 204 into the input shaft 206. From the input shaft 206, power is transferred into the second clutch gear 226 of the second wet clutch 224 as the second clutch gear 226 is engaged with the input shaft 206. Power is then transferred from the second clutch gear 226 into the second gear 214 via the second meshing and into the countershaft 208. From the countershaft 208, power is transferred into the third gear 216 and then into the fourth gear 218. The fourth gear 218 transfers power into the output shaft 210, from which power is transferred into the output interfaces 230 and to downstream components as previously described.

The table 300 as shown in FIG. 3C illustrates operational gear and clutch engagements for the first and second gear ratios of FIGS. 3A and 3B. In the first gear ratio, the first wet clutch 220 is engaged and the second wet clutch 224 is disengaged. In the second gear ratio, the first wet clutch 220 is disengaged and the second wet clutch 224 is engaged. Engagement of the first and second wet clutches may comprise a respective clutch gear (e.g., the first clutch gear 222 for the first wet clutch 220 and the second clutch gear 226 for the second wet clutch 224) engaging with a respective shaft (e.g., the countershaft 208 or the input shaft 206, respectively).

Figure 4:
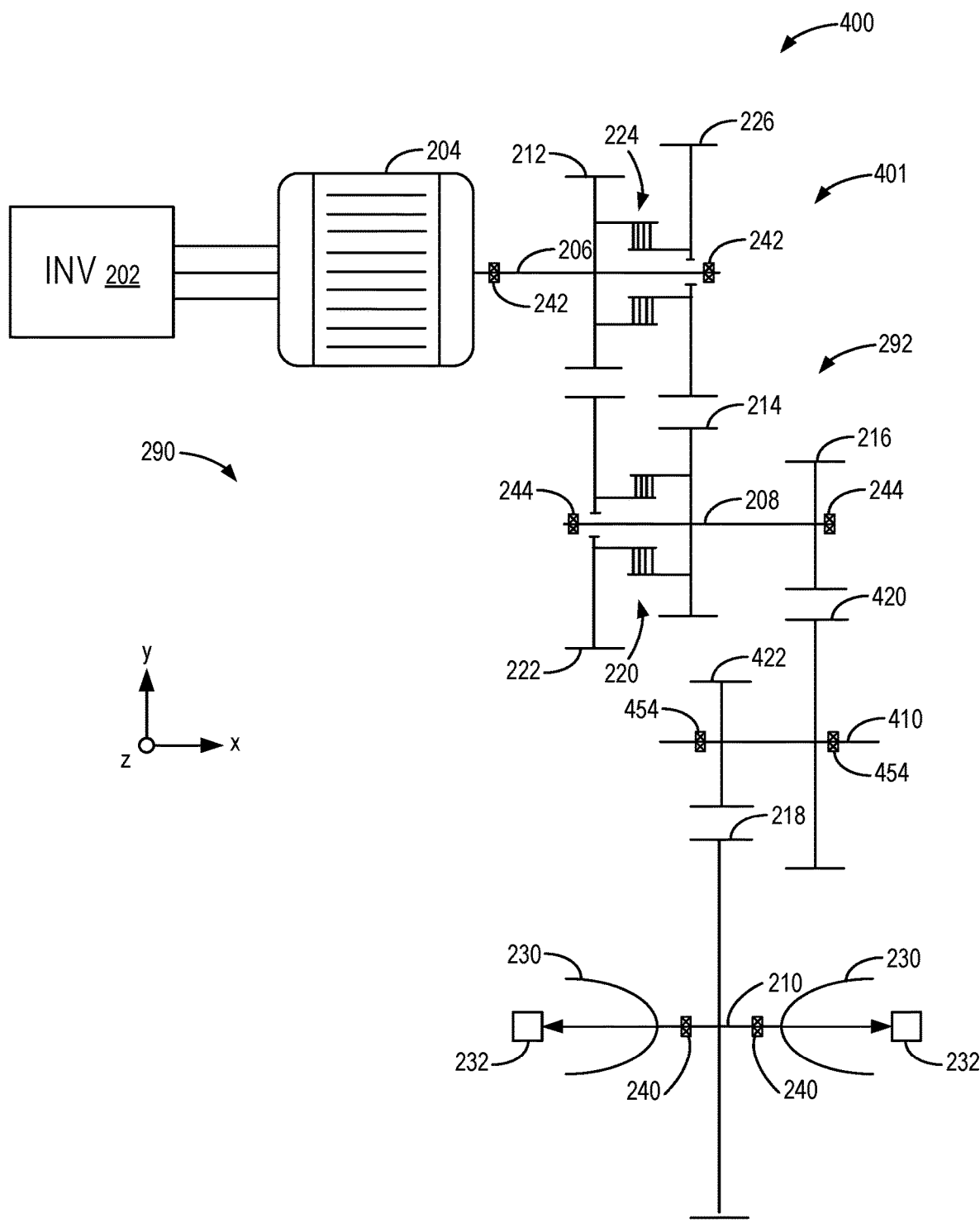
FIG. 4 shows a schematic of a two-speed transmission system according to a second embodiment.

Referring now to FIG. 4, a schematic layout of an exemplary electric transmission system 400 is shown. The electric transmission system 400, comprising the electric motor 204 and a multi-speed transmission 401, may be the same as the electric transmission system 200 with the addition of a layshaft 410. The multi-speed transmission 401 may comprise all the components of the multi-speed transmission 201, including the first wet clutch 220, the second wet clutch 224, the input shaft 206, the countershaft 208, the output shaft 210, the first gear 212, the second gear 214, the third gear 216, and the fourth gear 218. In the electric transmission system 400, the third and fourth gears 216, 218 may be differently sized than in the electric transmission system 200 in order to accommodate the layshaft 410 and gears thereof. The multi-speed transmission 401 further comprises additional components, including the layshaft 410, a fifth gear 420, and a sixth gear 422. The additional components of the multi-speed transmission 401 may be added to the multi-speed transmission 201 to form the multi-speed transmission 401, and, further, the additional components may be removed from the multi-speed transmission 401 to return to the multi-speed transmission 201.

As described with respect to FIG. 2, the electric motor 204 may be coupled to and drive the input shaft 206. Speed and torque of the electric motor 204 may be controlled by the inverter 202. The first gear 212 may be rotationally coupled to the input shaft 206 and may mesh with the first clutch gear 222 of the first wet clutch 220. The first wet clutch 220 may be positioned at the first end 290 of the countershaft 208. The second wet clutch 224 may be positioned at the second end 292 of the input shaft 206. The second clutch gear 226 of the second wet clutch 224 may mesh with the second gear 214. The third gear 216 may be further rotationally coupled to the countershaft 208.

Referring to the electric transmission system 200, the third gear 216 rotationally couples to the fourth gear 218. In the electric transmission system 400, the third gear 216 meshes with the fifth gear 420. The fifth gear 420 may rotationally couple to the layshaft 410. The layshaft 410 is further rotationally coupled to the sixth gear 422. The sixth gear 422 may be rotationally coupled to (e.g., meshed with) the fourth gear 218 that is rotationally coupled to the output shaft 210. As noted with respect to FIG. 2, the output shaft 210 may be coupled to the output interfaces 230 at either end of the output shaft 210 that are configured to interface with downstream components.

The layshaft 410 may carry gears of the electric transmission system 400 but is not directly coupled to the electric motor 204 or to outputs. The layshaft 410 may be below the countershaft 208 and above the output shaft 210 along the y-axis so as to increase a distance between the countershaft 208 and the output shaft 210. The layshaft 410 may be parallel to the input shaft 206, the countershaft 208, and the output shaft 210.

The electric transmission system 400 further includes a plurality of bearings. As described with respect to FIG. 2, rotation of the input shaft 206, the countershaft 208, and the output shaft 210 is supported and facilitated by bearings 242, 244, and 240, respectively. Rotation of the layshaft 410 may be supported and facilitated by bearings 454.

Clutch engagement and operational gears for the electric transmission system 400 may be similar to as described with respect to the electric transmission system 200 as noted in FIG. 3C, wherein in a first gear ratio, the first wet clutch 220 is engaged and the second wet clutch 224 is disengaged and in a second gear ratio, the first wet clutch 220 is disengaged and the second wet clutch 224 is engaged. A power path of a first gear ratio may include power transfer through the first gear 212, into the first wet clutch 220, from the first wet clutch 220 into the countershaft 208, from the countershaft 208 into the layshaft 410 via the third gear 216 and the fifth gear 420, and from the layshaft 410 into the output shaft 210 via the sixth gear 422 and the fourth gear 218. A power path of a second gear ratio may include power transfer through the second wet clutch 224 into the second gear 214, from the second gear 214 into the countershaft 208, from the countershaft 208 into the layshaft 410 via the third gear 216 and the fifth gear 420, and from the layshaft 410 into the output shaft 210 via the sixth gear 422 and the fourth gear 218.

The addition of the layshaft 410 in the electric transmission system 400 compared to the electric transmission system 200 may allow the transmission to reach high overall torque ratio, which may be desirable for certain vehicle applications. A housing for the transmission may be configured to accommodate the additional shaft and gears. The layshaft 410 and the fifth and sixth gears 420, 422 may be removable from the electric transmission system 400, as previously described. In this way, the transmission may be adjustable based on desired vehicle application and ratio demands of the desired vehicle application. For applications with smaller ratio demands, the transmission 201 may be utilized, reducing manufacturing and production demands due to reduced number of components and increased compactness.

Figure 5A:
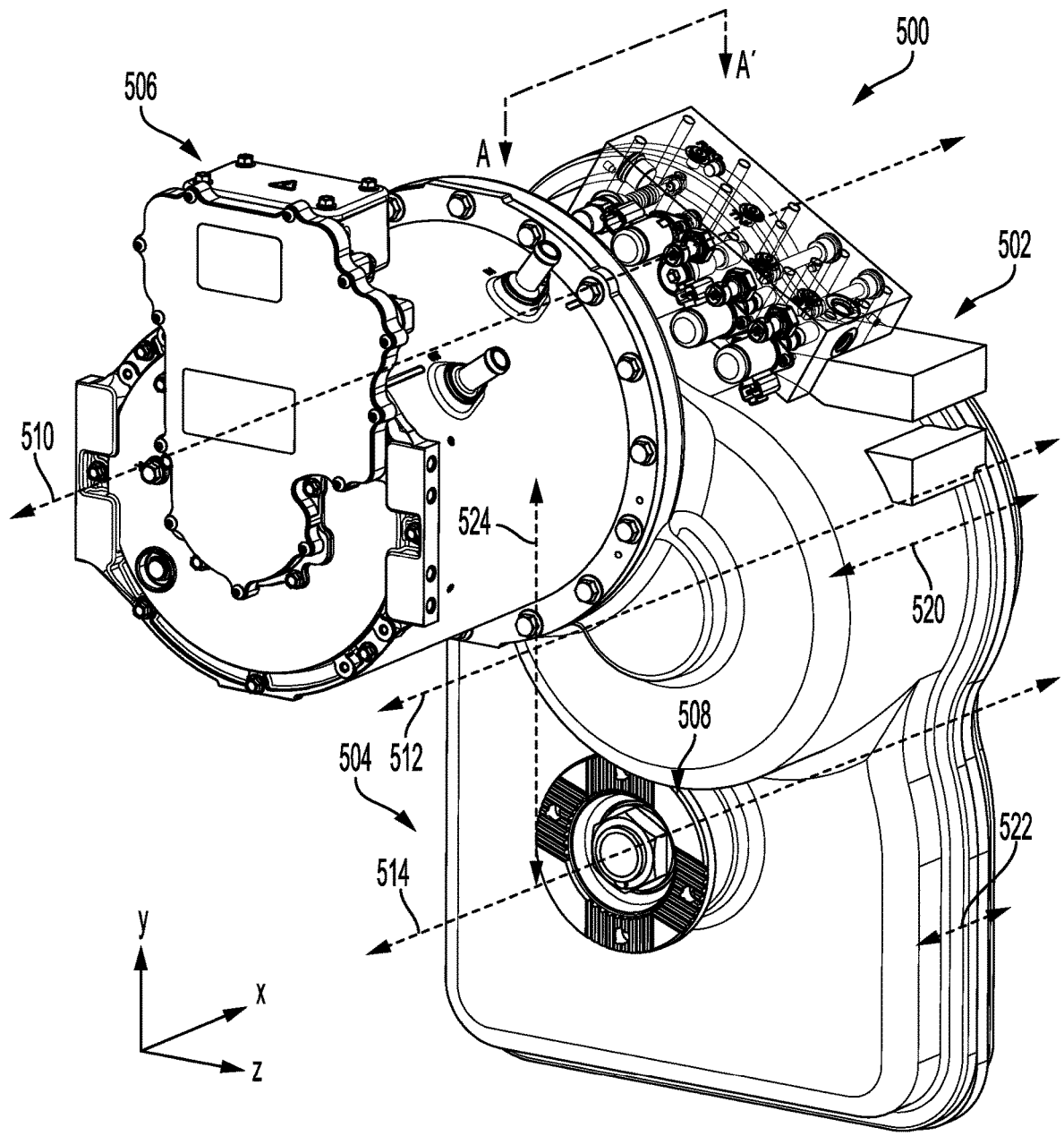
FIG. 5A shows a schematic of a transmission housing for the two speed transmission system.

Turning now to FIG. 5A, an example of a transmission housing 500 is shown. FIG. 5A is drawn to scale, although other relative dimensions may be used if desired. The electric transmission system 200 of FIG. 2 or the electric transmission system 400 of FIG. 4 may be housed inside the transmission housing 500. The transmission housing 500 may be conceptually divided into an upper section 502 and a lower section 504. The upper section 502 may house the input shaft and the countershaft, with the first and second wet clutches and first, second, and third gears thereon. The lower section 504 may house the output shaft and fourth gear thereon, as well as the layshaft and the fifth and sixth gears of the electric transmission system 400 in the second embodiment.

In some embodiments, the electric motor 204 is housed inside a motor housing 506 coupled to the transmission housing 500 via an adaptor flange, as will be described with respect to FIG. 5B. The electric transmission system 200 (or the electric transmission system 400), the electric motor 204, and the control system 114 are not visible from the view of the transmission housing 500 shown in FIG. 5A.

A rotational axis 510 of the input shaft 206, a rotational axis 512 of the countershaft 208, and a rotational axis 514 of the output shaft 210 are depicted in FIG. 5A. Each of the rotational axes 510, 512, and 514 may be parallel to each other along the horizontal axis. A mechanical interface 508 (e.g., one of the output interfaces 230) may be one of two mechanical interfaces that are in line with the rotational axis 514. A second mechanical interface not visible in FIG. 5A may be positioned opposite the mechanical interface 508 along the lateral direction.

The upper section 502 may have a first width 520. The lower section 504 may have a second width 522. The first width 520 may be larger than the second width 522 such that a distance between the output interfaces 230 (e.g., between mechanical interfaces) is smaller than a length of the countershaft 208. Designing the transmission with this width variance may allow the transmission to be more effectively incorporated into space constrained vehicle platforms, such as front end loaders, in one use-case example. FIG. 5A also demonstrates a drop 524 of the transmission 201.

Figure 6:
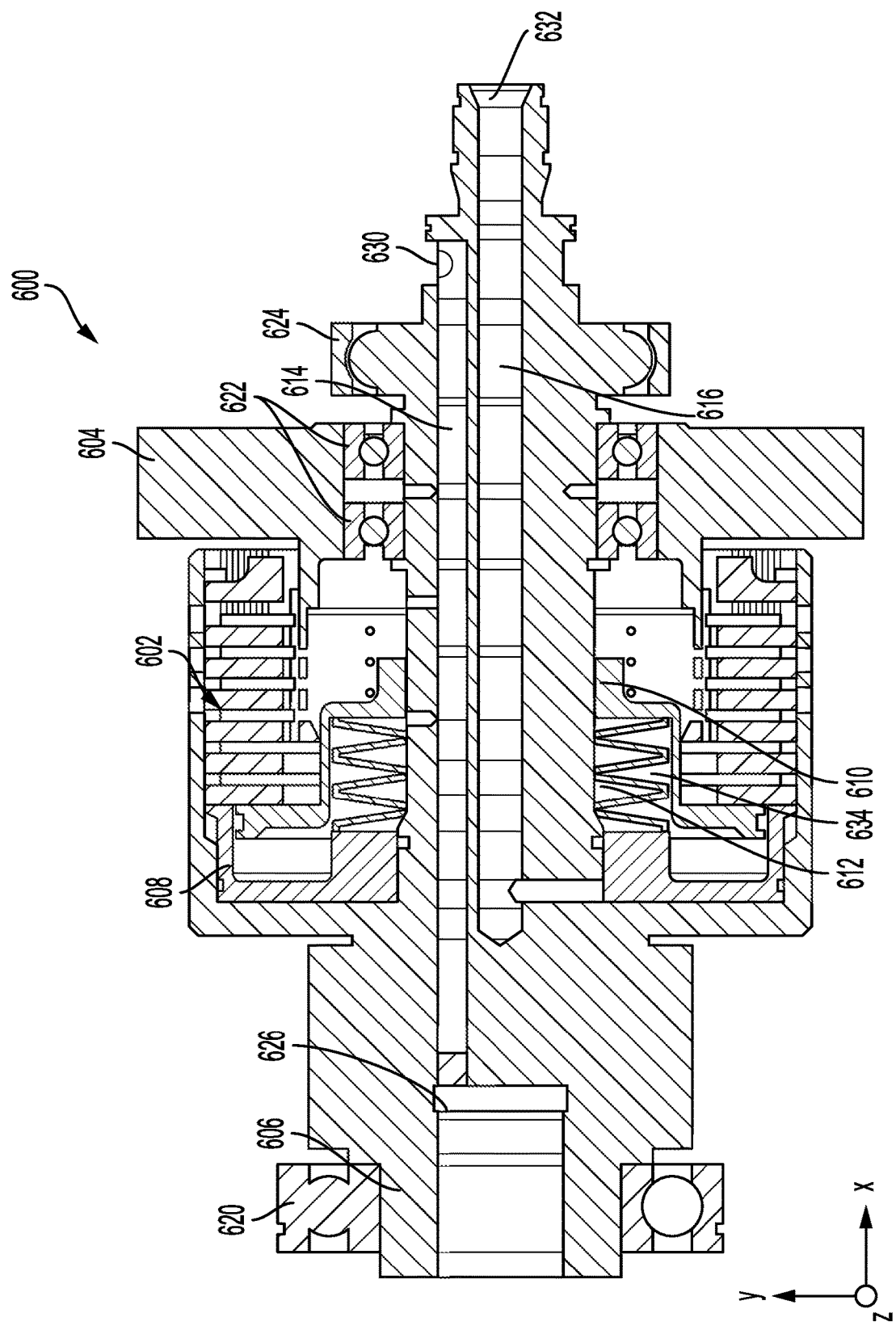
FIG. 6 shows a detailed schematic of an exemplary wet friction clutch in accordance with the present disclosure.

A cutting plane A-A' is illustrated in FIG. 5A indicating the cross-sectional view depicted in FIG. 6.

Figure 5B:
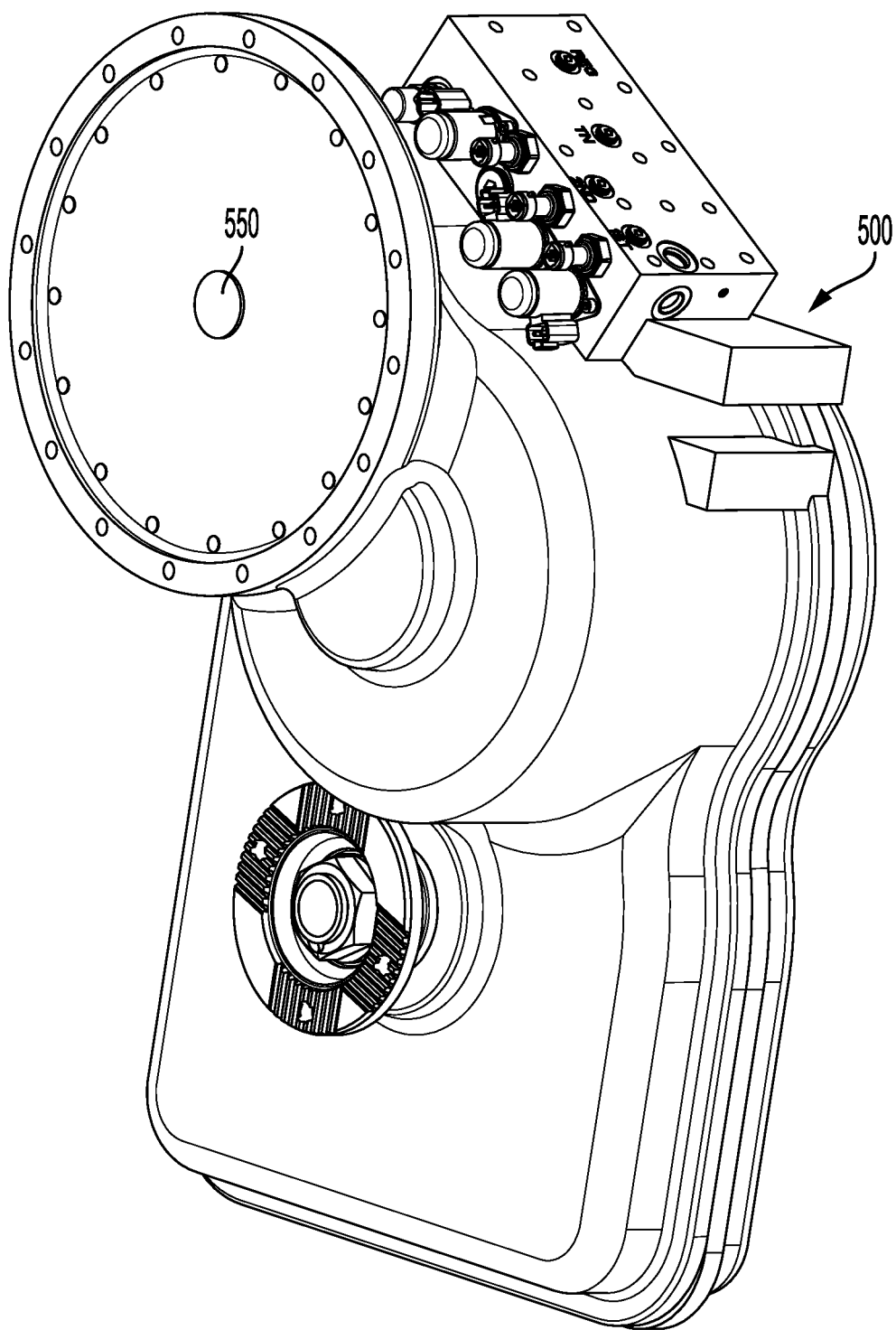
FIG. 5B shows a schematic of the transmission housing depicted in FIG. 5A without an electric motor.

FIG. 5B shows the transmission housing 500 with the electric motor 204 and motor housing 506 removed. In the view showed in FIG. 5B, an adaptor flange 550 is depicted. The adaptor flange 550 may be coupled to or otherwise formed with the transmission housing 500 and the input shaft 206. The adaptor flange 550 may be configured to couple the electric motor to the input shaft 206. The adaptor flange 550 may be configured to couple to a variety of electric machines with different generated input speeds, torques, ratios, and the like. In this way, the electric motor may be decoupleable from the transmission system so as to allow for changing of the electric motor to match vehicle application demands. In this way, the electric transmission system may be configured for a variety of vehicle applications based on electric motor parameters. Wet clutches, as included in the transmission system, may allow for increased flexibility as changes in input speed, torque, and inertia will still lead to good shift quality in comparison to the parameter tuning demanded for other types of clutches such as dog clutches and/or synchronizers.

Referring now to FIG. 6, an example wet friction clutch 600 in accordance with the present disclosure is shown. The wet friction clutch 600 may be an example of the second wet clutch 224 of the electric transmission systems 200 and 400. The wet friction clutch 600 may be coupled to an input shaft 606 and positioned towards one end of the input shaft 606, opposite an electric motor by which the input shaft 606 is driven. The wet friction clutch 600 may be housed within a transmission housing such as transmission housing 500 of FIGS. 5A and 5B. As described previously, bearings 620 and 624 may support and facilitate rotation of the input shaft 606.

The wet friction clutch 600 may comprise one or more friction plates 602, a clutch gear 604, a piston 608, a spring 612, a lubrication channel 614, and a counter pressure chamber 634. The lubrication channel 614 may be in fluid communication with a lubrication supply via an inlet 630 and with a chamber 626 to lubricate bearings 620. The lubrication supply holds a supply of fluid, such as oil, to lubricate and cool components of the wet friction clutch 600 including the one or more friction plates 602. The one or more friction plates 602 may be arranged in a multi-plate configuration. When the wet friction clutch 600 is engaged, the one or more friction plates 602 may engage via fluid pressure exerted on piston 608, allowing for torque transfer therethrough. When the wet friction clutch 600 is disengaged, the one or more friction plates 602 are disengaged from one another (e.g., frictionally decoupled).

A second lubrication channel 616, positioned parallel to the first lubrication channel 614, may be in fluid communication with a charging pressure inlet 632. When engaging or disengaging the wet friction clutch 600, hydraulic pressure via a second lubrication channel 616 increases or decreases pressure on the piston 608, respectively, resulting in extension or compression of the spring 612, respectively. The spring 612 may be located within the counter pressure chamber 634, namely between the piston 608 and a counter pressure chamber cover 610. The counter pressure chamber 634 may act to counteract centrifugal loading on the piston 608 as the pressure increase due to rotational speed behind piston 608 is compensated for by (almost) the same pressure increase on the other side of piston 608, namely in the counter pressure chamber 634 acting also on the piston but on the opposite side than the charging pressure. Engagement via the piston 608 and spring 612 may result in the clutch gear 604 engaging the input shaft 606. Rotation of the clutch gear 604 may be supported by bearings 622. Bearings 622 may be ball bearings in some examples.

The charging pressure inlet 632 may allow for axially applied pressure. As such the shaft end diameter can be reduced as there is no torque through the shaft and therefore no connection with other mechanical parts is demanded. A low seal diameter results in less drag for the same rotational speed. A rotary seal may be used to maintain the lubricant fluid inside the clutch assembly. A smaller rotary seal diameter as provided by the axially applied pressure may decrease rotary seal drag, thereby increasing efficiency of the assembly and overall system.

Figure 7:
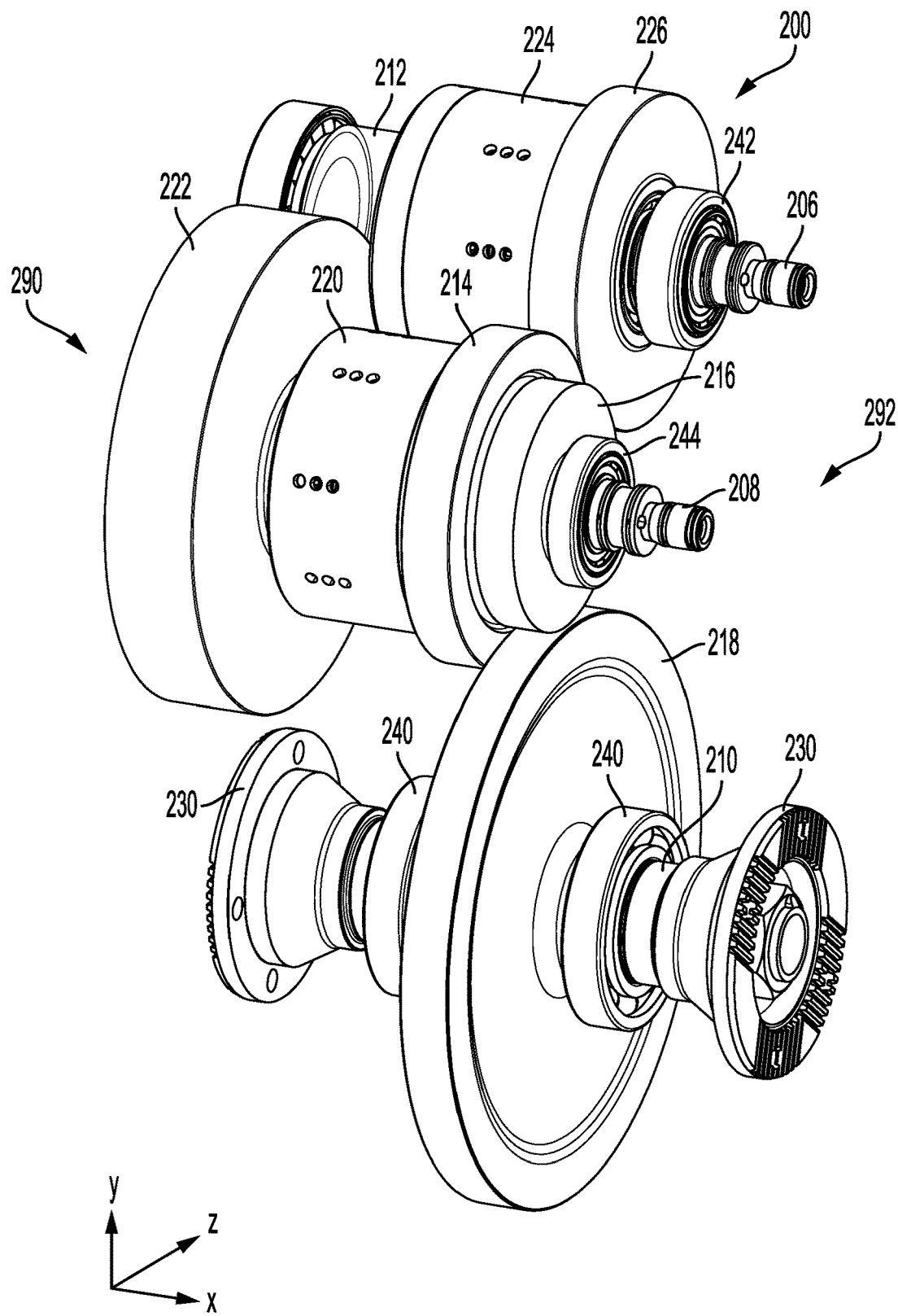
FIG. 7 shows a detailed schematic of the two-speed transmission system according to the first embodiment.
Figure 8:
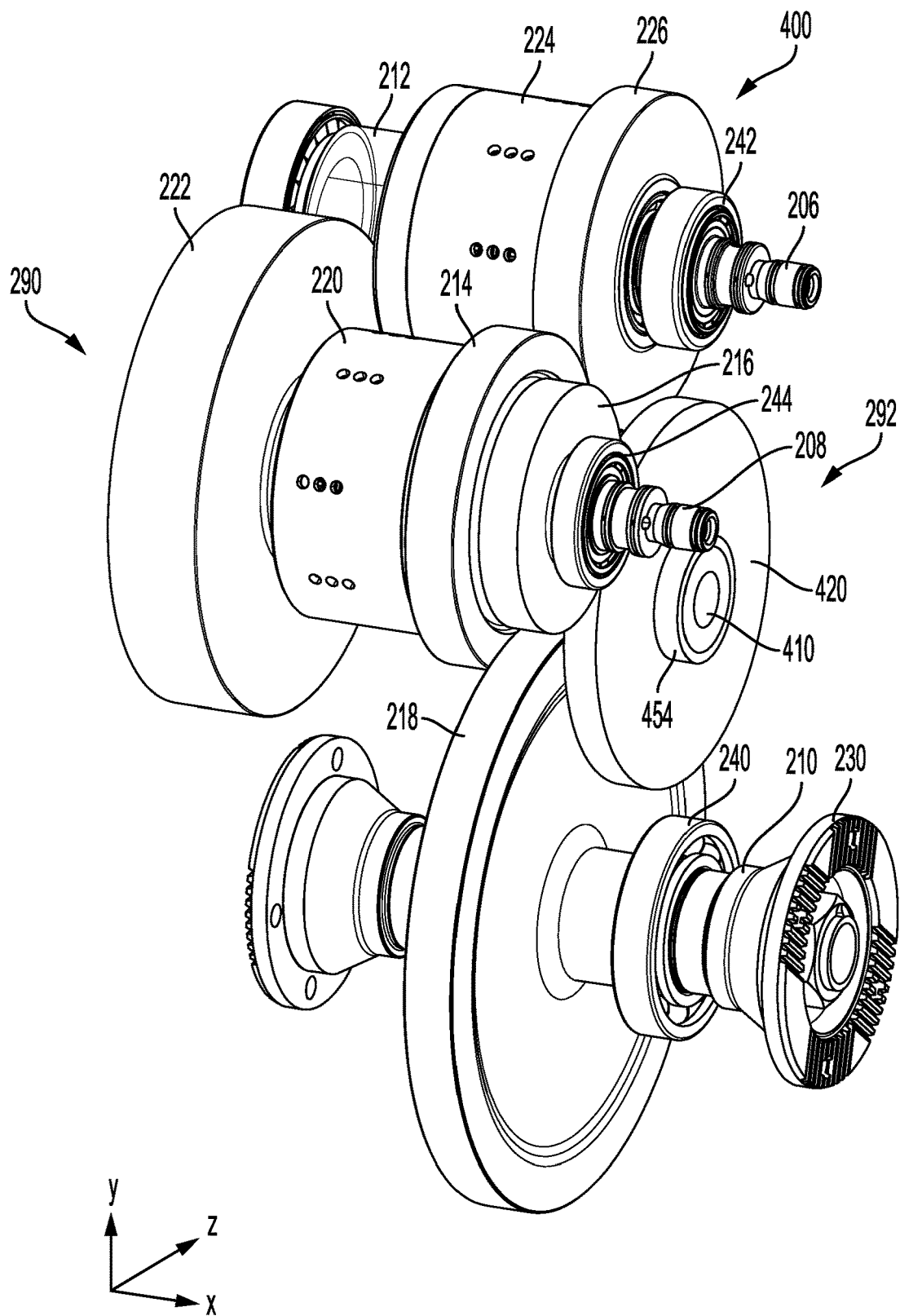
FIG. 8 shows a detailed schematic of the two-speed transmission system according to the second embodiment.

Turning now to FIGS. 7 and 8, examples are shown of the electric transmission system 200 and the electric transmission system 400, respectively. As such, similar component numbering is used. As is described with respect to FIG. 2, the electric transmission system 200 comprises a plurality of shafts, including the input shaft 206, the countershaft 208, and the output shaft 210. The first wet clutch 220, including the first clutch gear 222, is disposed on the countershaft 208 and positioned towards the first end 290. The second wet clutch 224, including the second clutch gear 226, is disposed on the input shaft 206 and positioned towards the second end 292. The first clutch gear 222 meshes with the first gear 212 and the second clutch gear 226 meshes with the second gear 214. The output shaft 210 may be rotationally coupled to the fourth gear 218, which, in the electric transmission system 200, may be rotationally coupled to the third gear 216 disposed on the countershaft 208, and, in the electric transmission system 400, may be rotationally coupled to the sixth gear 422 (not shown in FIG. 8). The sixth gear 422 may be positioned at the first end of the layshaft 410 and the fifth gear 420 may be positioned at the second end 292 of the layshaft 410.

The examples of electric transmission system 200, as shown in FIG. 7, and of electric transmission system 400, as shown in FIG. 8, demonstrate the longitudinal axis of the system. As an example, the input shaft 206 may be parallel to the countershaft 208 along the lateral axis, vertically above the countershaft 208 along the vertical axis, and offset from the countershaft 208 along the longitudinal axis. In some examples, the input shaft 206 may be further towards a rear of a vehicle than the countershaft 208. In other examples, the input shaft 206 may be further towards a front of the vehicle than the countershaft 208. Similarly, the output shaft 210 may be offset from the countershaft 208 and/or the input shaft 206 along the longitudinal direction.

Further, as shown in FIG. 8, the layshaft 410 may be offset from the input shaft 206, the countershaft 208, and the output shaft 210 along the longitudinal direction. A longitudinal axis of the layshaft 410 may be closer to a longitudinal axis of the input shaft 206 than to longitudinal axes of the countershaft 208 and the output shaft 210. In this way, the layshaft 410 may be added to the electric transmission system 200 to form the electric transmission system 400 without unduly increasing an overall package size. The positions of each of the shafts herein described may be configured based on size and arrangement of the gears and/or clutches and size and/or configuration of the transmission housing package in which the transmission is housed.

Figure 9:
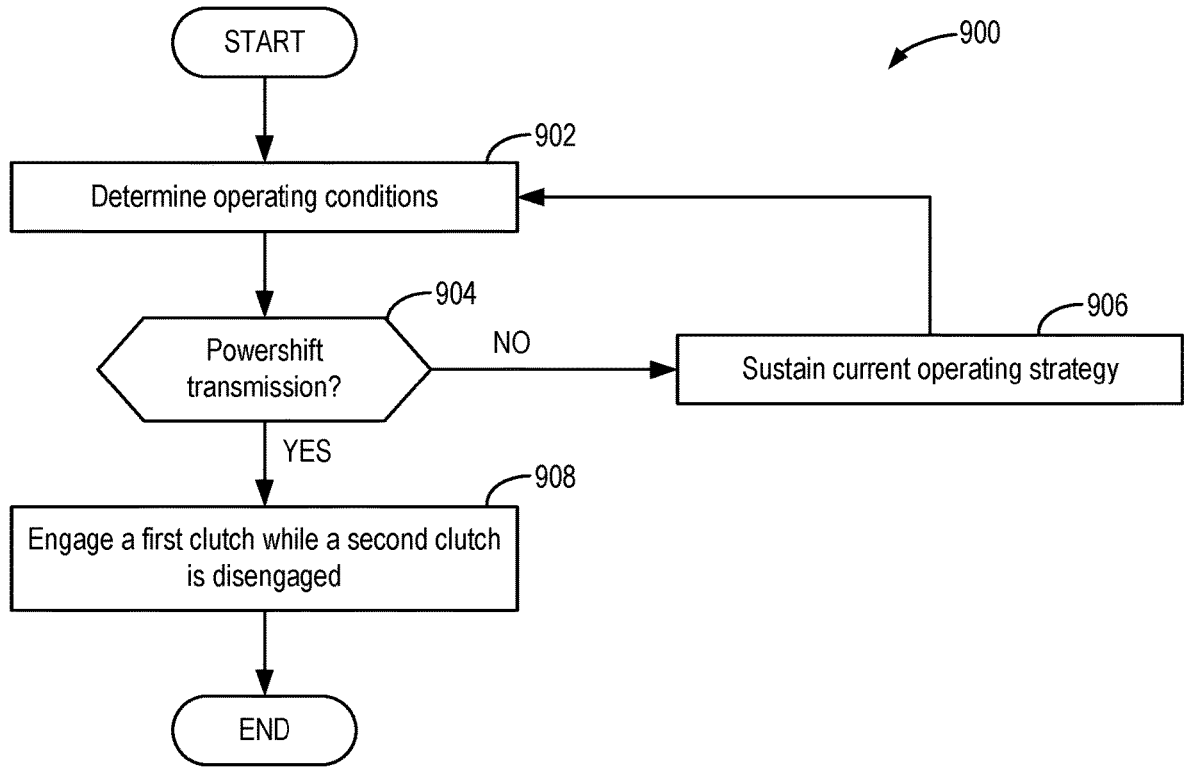
FIG. 9 shows a flowchart illustrating a method of operation of the two-speed transmission system.

FIG. 9 shows a flowchart illustrating a method 900 for operation of an electric transmission system that includes a multi-speed transmission system (e.g., a two-speed electrified transmission system). The method 900 may be carried out by any of the electric transmission systems or combinations of the electric transmission systems described herein with regards to FIGS. 1-8, in one example. In other examples, the method 900 may be implemented by other suitable electric transmission systems. Furthermore, the method 900 may be implemented by a controller that includes memory holding instructions for the method steps that are executable by a processor, as previously indicated.

At 902, method 900 includes determining operating conditions. The operating conditions may include input device position (e.g., a gearshift level position), clutch configuration, gear ratio, accelerator pedal position, transmission input/output speed, motor speed, vehicle speed, vehicle load, ambient temperature, and the like. The operating conditions may be ascertained via sensor inputs, modeling, look-up tables, and/or other suitable techniques.

At 904, the method 900 includes judging if the electric multi-speed transmission should be powershifted. Such a determination may be carried out responsive to vehicle speed surpassing a threshold value, in one example. In other examples, operator interaction with gear selector may initiate powershift operation. If it is determined that a powershift should not occur (NO at 904), the method 900 proceeds to 906 where the method 900 includes sustaining the transmission's current operating strategy. Method 900 may then return to 900 to again determine operating conditions and judge if the transmission should be powershifted.

Conversely, if it is determined that a powershift should occur (YES at 904), the method 900 proceeds to 908 where the method 900 includes engaging a first clutch while disengaging a second clutch while power delivery from the electric motor to the transmission is sustained. The first clutch as referenced with regard to the method 900 may be either the first wet clutch 220 or the second wet clutch 224 depending on the determined operating conditions of the electric transmission system. In this way, powershifting may include shifting from a first gear ratio to a second gear ratio wherein the second wet clutch 224 engages and the first wet clutch 220 disengages or, alternatively, shifting from the second gear ratio to the first gear ratio wherein the first wet clutch 220 engages and the second wet clutch 224 disengages.

In some examples, powershifting may include increasing torque transfer through one of the clutches and decreasing torque transfer through the other of the clutches. Further, the electric motor to which the transmission system is rotationally coupled may be peaked for a relatively short period of time during the powershifting transition to maintain torque at the output of the transmission at a substantially constant value or above a threshold value.

A technical effect of the two-speed electrified transmission system described herein is that the system provides increased efficiency as, by positioning the second wet friction clutch to selectively engage the input shaft, the electric transmission system may allow for high input speeds from the electric motor and may reduce degradation of the first wet friction clutch, thereby allowing the transmission system to operate at high efficiency by reducing slip speeds of each of the first and second wet friction clutches when the clutches are disengaged. Further, the wet clutches allow for increased flexibility by allowing for various electric motors to be included in the electric transmission system. Increased flexibility is also provided through selective addition of the layshaft based on application while maintaining compactness of the overall package.

The disclosure also provides support for a two-speed electrified transmission system, comprising: an electric motor driving an input shaft, a first wet clutch positioned on a first end of a countershaft to selectively engage the countershaft with a first clutch gear, a second wet clutch positioned on a second end of the input shaft to selectively engage the input shaft with a second clutch gear, wherein the input shaft meshes with the second clutch gear and the countershaft meshes with the first clutch gear, and an output shaft rotationally coupled to the countershaft. In a first example of the system, the input shaft is rotationally coupled to a first gear that meshes with the first clutch gear. In a second example of the system, optionally including the first example, the countershaft is rotationally coupled to a second gear that meshes with the second clutch gear. In a third example of the system, optionally including one or both of the first and second examples, the countershaft is rotationally coupled to a third gear that is rotationally coupled to the output shaft. In a fourth example of the system, optionally including one or more or each of the first through third examples, the third gear meshes with a fourth gear that is rotationally coupled to the countershaft. In a fifth example of the system, optionally including one or more or each of the first through fourth examples, the output shaft is coupled to one or more output interfaces. In a sixth example of the system, optionally including one or more or each of the first through fifth examples, the system further comprises: a layshaft rotationally coupled to the countershaft via a fifth gear and to the output shaft via a sixth gear. In a seventh example of the system, optionally including one or more or each of the first through sixth examples, the input shaft, the countershaft, and the output shaft are parallel to each other. In a eighth example of the system, optionally including one or more or each of the first through seventh examples, the input shaft is vertically above the countershaft and the countershaft is vertically above the output shaft. In a ninth example of the system, optionally including one or more or each of the first through eighth examples in a first gear ratio, the first wet clutch is engaged and the second wet clutch is disengaged. In a tenth example of the system, optionally including one or more or each of the first through ninth examples in a second gear ratio, the second wet clutch is engaged and the first wet clutch is disengaged. In a eleventh example of the system, optionally including one or more or each of the first through tenth examples, the first and second wet clutches are multi-plate wet friction clutches.

The disclosure also provides support for a method of operation of a transmission system, comprising: powershifting between a first gear ratio and a second gear ratio via disengagement of a first wet friction clutch and engagement of a second wet friction clutch and vice versa, wherein the transmission system comprises: an electric motor rotationally coupled to an input shaft, a countershaft rotationally coupled to the input shaft, and an output shaft rotationally coupled to the countershaft, wherein the first wet friction clutch selectively engages the countershaft and the second wet friction clutch selectively engages the input shaft. In a first example of the method, the first wet friction clutch, when engaged, rotationally couples the countershaft to the input shaft via a first gear meshing in the first gear ratio. In a second example of the method, optionally including the first example, the second wet friction clutch, when engaged, rotationally couples the input shaft to the countershaft via a second gear meshing in the second gear ratio. In a third example of the method, optionally including one or both of the first and second examples, the transmission system further comprises a layshaft rotationally coupled to the countershaft and the output shaft.

The disclosure also provides support for a multi-speed electric transmission system, comprising: an electric traction motor rotationally coupled to an input shaft, and an electric transmission comprising: a first wet clutch configured to selectively engage a countershaft, a second wet clutch configured to selectively engage the input shaft driven by the electric traction motor, and an output shaft rotationally coupled to the countershaft, wherein the first wet clutch, when engaged, rotationally couples the countershaft to the input shaft via a first gear, and the second wet clutch, when engaged, rotationally couples the input shaft to the countershaft via a second gear. In a first example of the system, the electric transmission is enclosed within a transmission housing. In a second example of the system, optionally including the first example, the electric traction motor is decoupleable from the input shaft via an adaptor flange coupled to the input shaft. In a third example of the system, optionally including one or both of the first and second examples, the electric transmission is configured for addition of a layshaft with two additional gears.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric transmission system and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A two-speed electrified transmission system, comprising:
    an electric motor driving an input shaft, wherein the input shaft is rotationally coupled to a first gear that meshes with a first clutch gear;
    a first wet clutch positioned on a first end of a countershaft to selectively engage the countershaft with the first clutch gear;
    a second wet clutch positioned on a second end of the input shaft to selectively engage the input shaft with a second clutch gear, wherein the input shaft meshes with the second clutch gear and the countershaft meshes with the first clutch gear; and
    an output shaft rotationally coupled to the countershaft.

2. The two-speed electrified transmission system of claim 1, wherein the countershaft is rotationally coupled to a second gear that meshes with the second clutch gear.

3. The two-speed electrified transmission system of claim 1, wherein the countershaft is rotationally coupled to a third gear that is rotationally coupled to the output shaft.

4. The two-speed electrified transmission system of claim 3, wherein the third gear meshes with a fourth gear that is rotationally coupled to the countershaft.

5. The two-speed electrified transmission system of claim 1, wherein the output shaft is coupled to one or more output interfaces.

6. The two-speed electrified transmission system of claim 1, further comprising a layshaft rotationally coupled to the countershaft via a fifth gear and to the output shaft via a sixth gear.

7. The two-speed electrified transmission system of claim 1, wherein the input shaft, the countershaft, and the output shaft are parallel to each other.

8. The two-speed electrified transmission system of claim 1, wherein the input shaft is vertically above the countershaft and the countershaft is vertically above the output shaft.

9. The two-speed electrified transmission system of claim 1, wherein, in a first gear ratio, the first wet clutch is engaged and the second wet clutch is disengaged.

10. The two-speed electrified transmission system of claim 1, wherein, in a second gear ratio, the second wet clutch is engaged and the first wet clutch is disengaged.

11. The two-speed electrified transmission system of claim 1, wherein the first and second wet clutches are multi-plate wet friction clutches.

12. A method of operation of a transmission system, comprising:
    powershifting between a first gear ratio and a second gear ratio via disengagement of a first wet friction clutch and engagement of a second wet friction clutch and vice versa, wherein the transmission system comprises:
        an electric motor rotationally coupled to an input shaft;
        a countershaft rotationally coupled to the input shaft; and
        an output shaft rotationally coupled to the countershaft, wherein the first wet friction clutch selectively engages the countershaft and the second wet friction clutch selectively engages the input shaft.

13. The method of claim 12, wherein the first wet friction clutch, when engaged, rotationally couples the countershaft to the input shaft via a first gear meshing in the first gear ratio.

14. The method of claim 12, wherein the second wet friction clutch, when engaged, rotationally couples the input shaft to the countershaft via a second gear meshing in the second gear ratio.

15. The method of claim 12, wherein the transmission system further comprises a layshaft rotationally coupled to the countershaft and the output shaft.

16. A multi-speed electric transmission system, comprising:
    an electric traction motor rotationally coupled to an input shaft; and
    an electric transmission comprising:
        a first wet clutch configured to selectively engage a countershaft;
        a second wet clutch configured to selectively engage the input shaft driven by the electric traction motor, wherein, in a first gear ratio, the first wet clutch is engaged and the second wet clutch is disengaged; and
        an output shaft rotationally coupled to the countershaft, wherein the first wet clutch, when engaged, rotationally couples the countershaft to the input shaft via a first gear, and the second wet clutch, when engaged, rotationally couples the input shaft to the countershaft via a second gear.

17. The multi-speed electric transmission system of claim 16, wherein the electric transmission is enclosed within a transmission housing.

18. The multi-speed electric transmission system of claim 16, wherein the electric traction motor is decoupleable from the input shaft via an adaptor flange coupled to the input shaft.

19. The multi-speed electric transmission system of claim 16, wherein the electric transmission is configured for addition of a layshaft with two additional gears, wherein the layshaft is rotationally coupled to the countershaft and to the output shaft.

* * * * *